United States Patent [19]
Hughes

[11] Patent Number: 5,893,533
[45] Date of Patent: Apr. 13, 1999

[54] COMBINATION SPACE STATION HANDRAIL CLAMP AND POINTING DEVICE

[75] Inventor: Stephen J. Hughes, Hampton, Va.

[73] Assignee: The United Stated of America as represented by the Administrator of the National Aeronautics and Space Administration, Washington, D.C.

[21] Appl. No.: 08/717,203

[22] Filed: Sep. 18, 1996

Related U.S. Application Data

[60] Provisional application No.60/019,992, Jun. 18, 1996.

[51] Int. Cl.⁶ ...................................................... B64G 4/00
[52] U.S. Cl. .................................. 244/118.1; 244/158 R; 269/228; 269/75
[58] Field of Search .................. 248/214, 229.1–229.17, 248/228.2; 269/228, 75; 244/118.1, 158 R, 129.1

[56] References Cited

U.S. PATENT DOCUMENTS

| | | | |
|---|---|---|---|
| 1,981,253 | 11/1934 | Schulz | 269/75 |
| 2,456,182 | 12/1948 | Goble | 269/75 |
| 2,528,053 | 10/1950 | Harris | 269/75 |
| 2,645,144 | 7/1953 | Williams | 269/228 |
| 2,660,079 | 11/1953 | Bellows | 269/75 |
| 2,673,054 | 3/1954 | Slavik | 269/75 |
| 4,787,613 | 11/1988 | Hayes | 269/75 |

*Primary Examiner*—Galen L. Barefoot
*Attorney, Agent, or Firm*—Kurt G. Hammerle

[57] ABSTRACT

A device for attaching an experiment carrier to a space station handrail is provided. The device has two major components, a clamping mechanism for attachment to a space station handrail, and a pointing carrier on which an experiment package can be mounted and oriented. The handrail clamp uses an overcenter mechanism and the carrier mechanism uses an adjustable preload ball and socket for carrier positioning. The handrail clamp uses a stack of disk springs to provide a spring loaded button. This configuration provides consistent clamping force over a range of possible handrail thicknesses. Three load points are incorporated in the clamping mechanism thereby spreading the clamping load onto three separate points on the handrail. A four bar linkage is used to provide for a single actuation lever for all three load points. For additional safety, a secondary lock consisting of a capture plate and push lock keeps the clamp attached to the handrail in the event of main clamp failure. For the carrier positioning mechanism, a ball in a spring loaded socket uses friction to provide locking torque; however, the ball and socket are torque limited so that the ball can slip under kick loads (125 pounds or greater). A lead screw attached to disk spring stacks is used to provide an adjustable spring force on the socket. A locking knob is attached to the lead screw to allow for hand manipulation of the lead screw.

7 Claims, 8 Drawing Sheets

COMBINATION SPACE STATION HANDRAIL CLAMP AND POINTING DEVICE

This application claims the benefit of U.S. Provisional Application Ser. No. 60/019,992, filed Jun. 18, 1996.

ORIGIN OF THE INVENTION

The invention described herein was made by an employee of the United States Government and may be manufactured and used by or for the Government for any governmental purpose without payment of any royalties thereon or therefor.

BACKGROUND OF THE INVENTION

The invention relates to space station clamping and pointing devices. In particular, a device for attaching to a space station handrail and providing precision positioning of a attached payload under orbital conditions is provided.

In order to elevate the chances of success for the International Space Station Alpha program, the National Aeronautics and Space Administration began an effort to study environmental risks at space station handrail altitudes. Four experiments were proposed, each of which would have to be mounted to the existing Russian MIR space station handrail without modification to the Russian manufactured docking module. In two of the cases, ram/wake viewing of the experiment was required which required MIR flight orientation data. However, analysis of this data would not be complete before the deployment of the experiments.

In light of these requirements, NASA undertook the development of a clamp for attaching and positioning a common carrier in which each of the experiments could be mounted. The attachment end of the clamp was required to exert a force of 1000 newtons on a space station handrail; however, the exact dimensions of the space station handrail were unknown—thus, it was necessary that the clamp be able to provide a consistent 1000 newton force over the entire range of possible space station handrail thicknesses. Additionally, the space station handrail clamp should be able to exert pressure at several points, both to increase the stability of the clamp and to prevent a concentrated, and perhaps deforming, load from being applied at one point on the space station handrail. Finally, since the clamp would be deployed during free-floating extravehicular activities (EVAs), it was important that the clamp mechanisms be large enough to facilitate operation by an astronaut wearing a complete spacesuit, that the mechanism itself have no sharp corners or edges, and that the device require no more than a 120 newton force exerted through one hand during installation.

The pointer end of the device also had strict requirements to achieve the precision positioning required for the experiments. First, the pointer had to provide sufficient strength to hold the position of the attached device in accelerations of up to 0.5 g (4.9 m/s$^2$). However, to prevent accidental deformation of the space station handrail to which the device was attached, the payload had to be able to slip in position when a kick load of 125 pounds or greater was applied. Finally, the pointer also had to meet the same requirements as the space station handrail attachment in terms of installation by an astronaut during EVA.

Finally, all components of the device had to be suitable for spaceflight; specifically, they had to retain operability at extreme low temperatures, be constructed of materials which would not outgas, operate without lubrication, and use dissimilar materials at points of contact to prevent cold welds from occurring.

No prior art attachment and positioning devices met the stringent requirements necessary for the MIR space station handrail deployment.

SUMMARY OF INVENTION

Accordingly, it is an object of the present invention to provide a device for attachment and flexible, high precision positioning of an attached carrier to a space station handrail.

It is another object of the present invention to provide for a distribution of the attaching load of the device on the space station handrail, resulting in higher stability of the device while minimizing the chance of deformation of the space station handrail.

Still another object is to provide constant, consistent clamping load on the space station handrail despite variations in the width of the space station handrail.

A further object of the present invention is to maintain precision positioning of the attached carrier under accelerations of up to 0.5 g.

A still further object is to allow the position of the attached carrier to slip under kick forces that might result in deformation of the space station handrail if the position of the carrier was held rigid.

Yet another object is to provide a device which can be installed and operated during extravehicular activities; particularly, one which requires only one handed operation, and limited application of force.

A further object is to provide a spaceflight ready device, specifically, one which meets the outgassing and operating temperature requirements for space operations.

In accordance with these and other objects, the invention is a device for attaching a carrier to a space station handrail which utilizes an overcenter mechanism for the space station handrail clamp and an adjustable preload ball and socket for carrier positioning. The handrail clamp uses a stack of disk springs to provide a spring loaded button which provides consistent clamping force over a range of possible handrail thicknesses. Three load points are incorporated in the clamping mechanisms, spreading the clamping load onto three separate points on the handrail. A four bar linkage is used to provide for a single actuation lever for all three load points. For additional safety, a secondary lock consisting of a capture plate and push lock keeps the clamp attached to the handrail in the event of main clamp failure. For the carrier positioning mechanism, a ball in a spring loaded socket uses friction to provide locking torque; however, the ball and socket are torque limited so that the ball can slip under kick loads (125 pounds or greater). A lead screw attached to disk spring stacks is used to provide an adjustable spring force on the socket. A locking knob is attached to the lead screw to allow for hand manipulation of the lead screw.

BRIEF DESCRIPTION OF THE DRAWINGS

For a more complete understanding of the present invention and for further objects and advantages thereof, reference is now made to the following description taken in conjunction with the accompanying drawings in which.

DETAILED DESCRIPTION OF THE INVENTION

Figure 1:
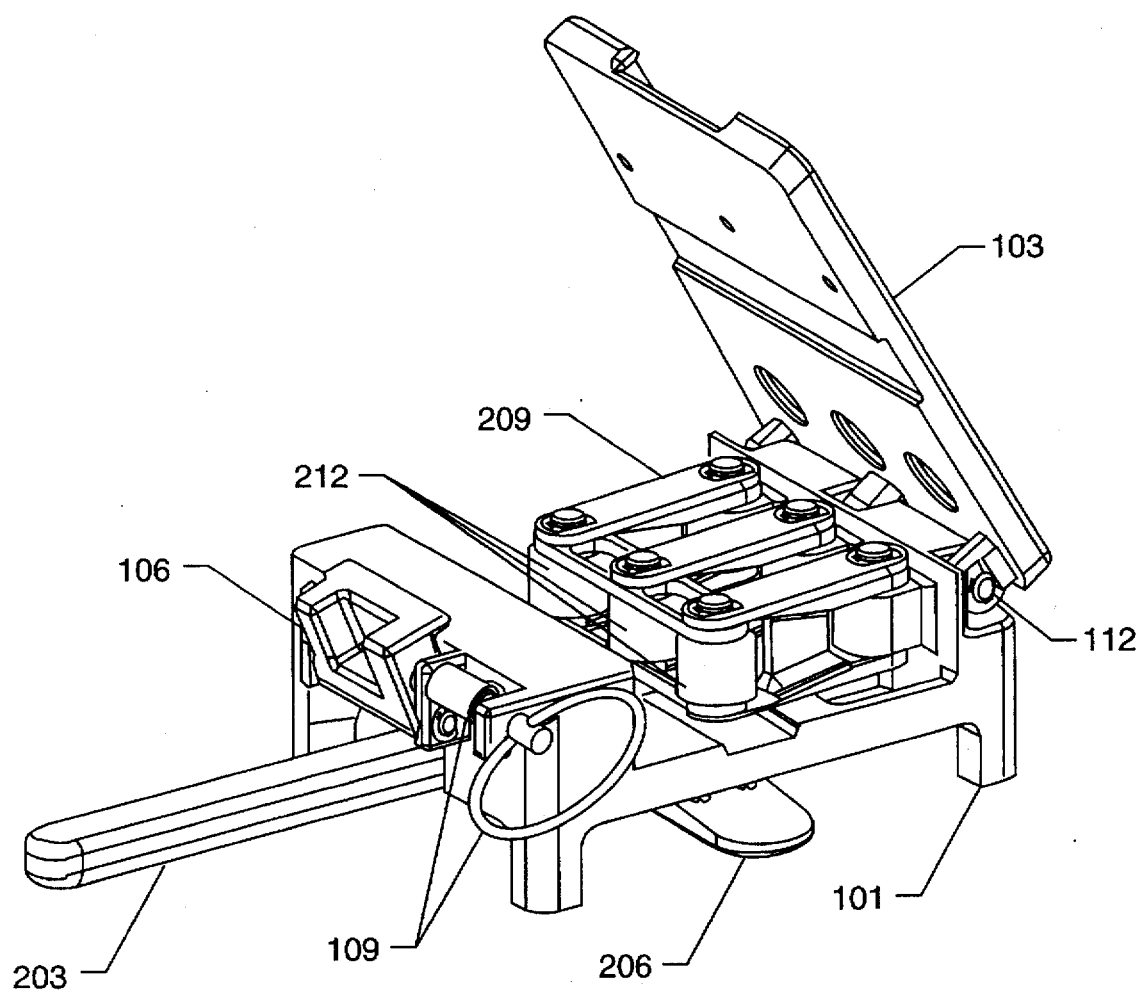
FIG. 1 is a depiction of the handrail clamp assembly of the preferred embodiment of the invention.
Figure 2A:
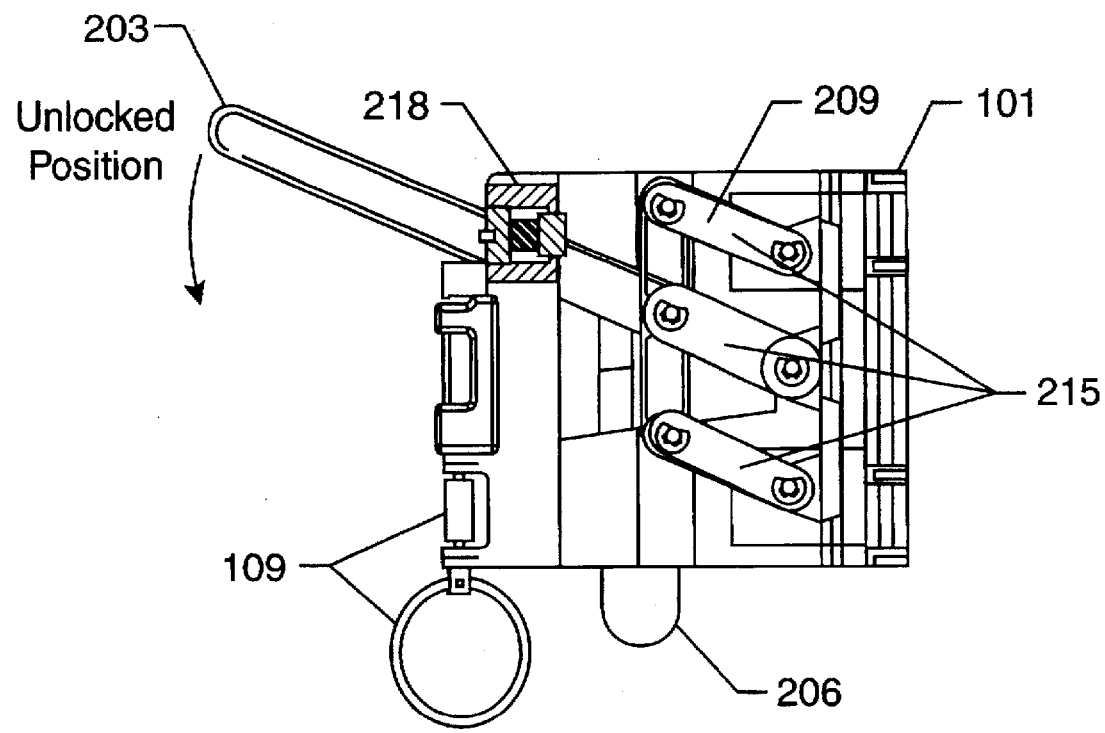
FIG. 2A is a side view of the handrail clamp assembly in the locked position of the present invention.
Figure 2B:
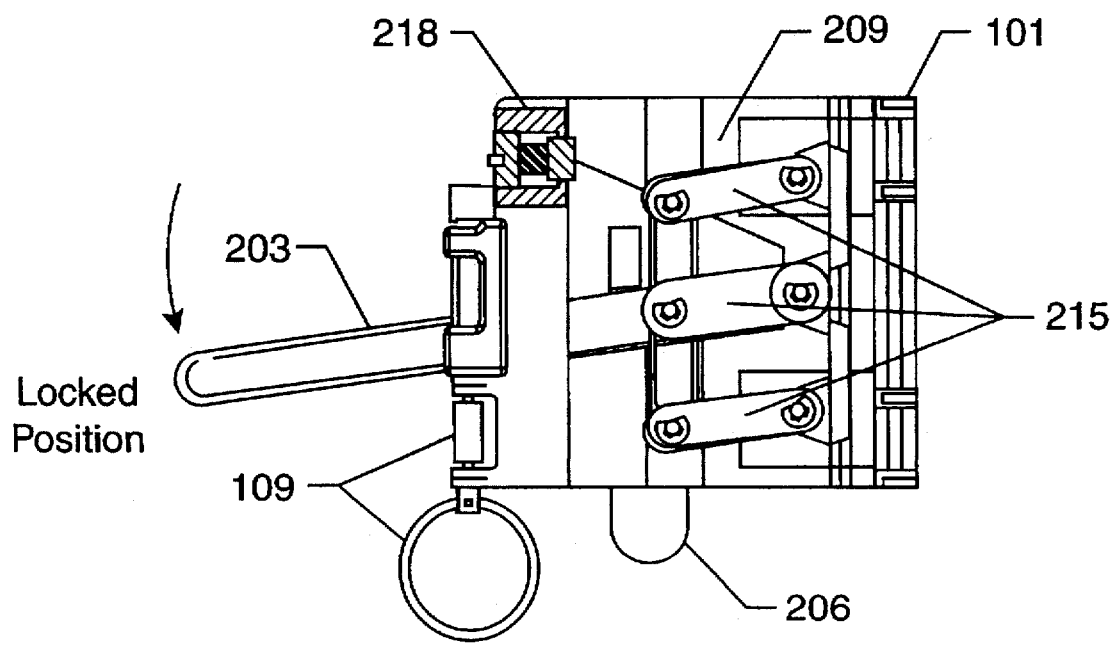
FIG. 2B is a side view of the handrail clamp assembly in the unlocked position of the present invention.
Figure 3:
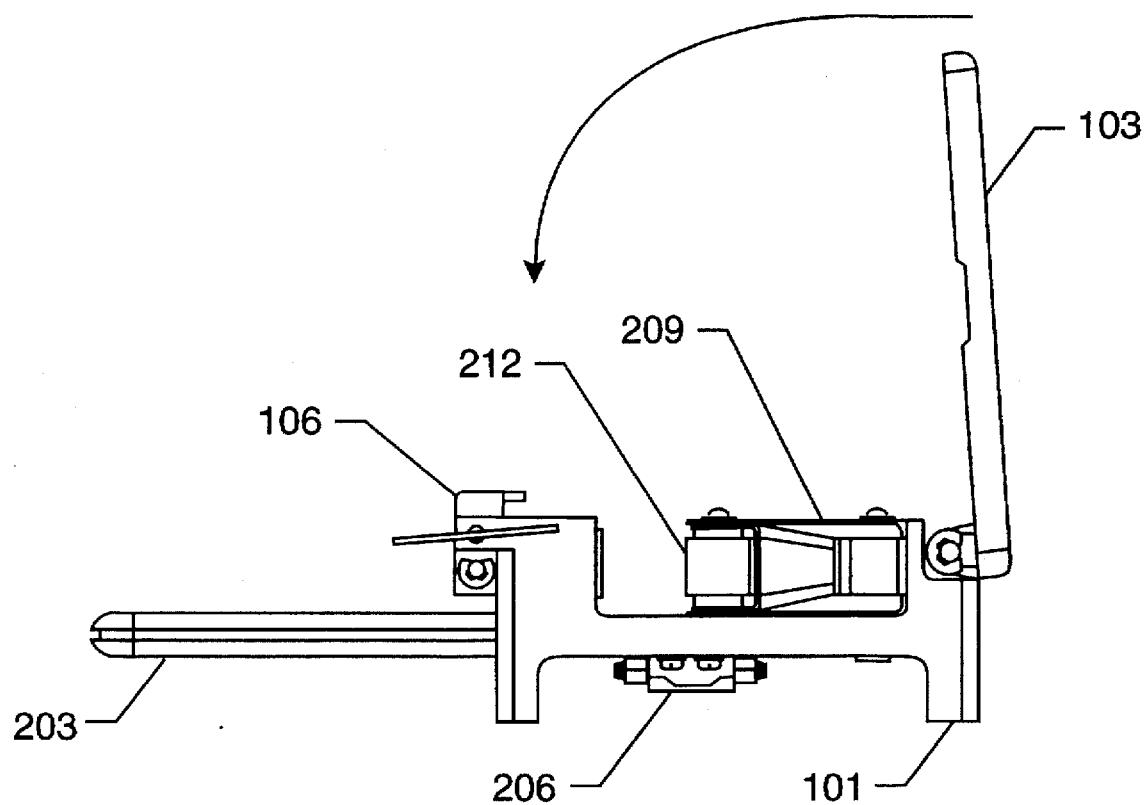
FIG. 3 is a top view of the handrail clamp assembly of the present invention.

Referring now to the drawings, and in particular to FIGS. 1, 2A, 2B and 3, the handrail clamp portion of the present invention is shown in detail. Clamp casing 101 provides a rigid structure to which the attachment hardware is connected. Capture plate 103 is affixed to clamp casing 101 through hinging mechanism 112. Hinging mechanism 112 allows capture plate 103 to be rotated away from clamp casing 101 as shown in FIGS. 1 and 3. Capture plate 103 is constructed of a rugged, durable material of similar nature to clamp casing 101. When capture plate 103 is rotated such that it is closed (place parallel to clamp casing 101), then capture plate lock 106 may be rotated such that it clips over capture plate 103, effectively holding it static relative to clamp casing 101. Capture plate lock 106 moves freely and must be held in place through the use of capture plate release pin 109. Capture plate release pin 109 inserts through a hole in clamp casing 101 aligned with a similar hole in capture plate lock 106, locking capture plate lock 106 rigidly in place relative to clamp casing 101. Capture plate 103 and clamp casing 101 provide a safety means for holding the present invention attached to a handrail in case of primary clamp failure.

The main attachment means is driven by the action of bearing assembly 209. Bearing assembly 209 is rigidly attached to clamp casing 101. One side of bearing assembly 209, the two interior sides of clamp casing 101, and the interior side of capture plate 103 provide an aperture through which the handrail may pass freely. Bearing assembly 209 can be adjusted so that it grips the handrail tightly by using clamp lever 203. When clamp lever 203 is moved as indicated in FIG. 2B, it shifts the alignment of linkage 215, causing the three bearings 212 to move into the aperture space, pressing against the handrail. In addition to the overcenter locking force a redundant level lock 206 is provided to hold the bearings 212 in the locked position. The level lock 206 is automatically engaged when the lever 203 is adjusted from the unlocked to the locked position. Lever lock 206 must be depressed before lever 203 can be adjusted from the locked to unlocked position. In addition to the force exerted on the handrail by bearings 212, disk spring stacks 218 also press against the handrail directly opposing the pressure points of bearings 212. The use of disk spring stacks 218 is important because the disk springs provide the present invention the ability to maintain a constant force despite variations in the thickness of the handrail. Since disk spring stacks 218 are independent of each other, this applies to variations in thickness within a given handrail as well as to variations in thickness between multiple handrails. Multiple bearings 212 and disk spring stacks 218 are used to spread the clamping load over several points of the handrail. This allows the present invention to maintain a strong grip on the handrail without deforming the handrail under excessive loads. The present invention uses three bearings and disk spring stacks; however, this number could be adjusted to better distribute the handrail clamping load within the scope of the invention.

Figure 4:
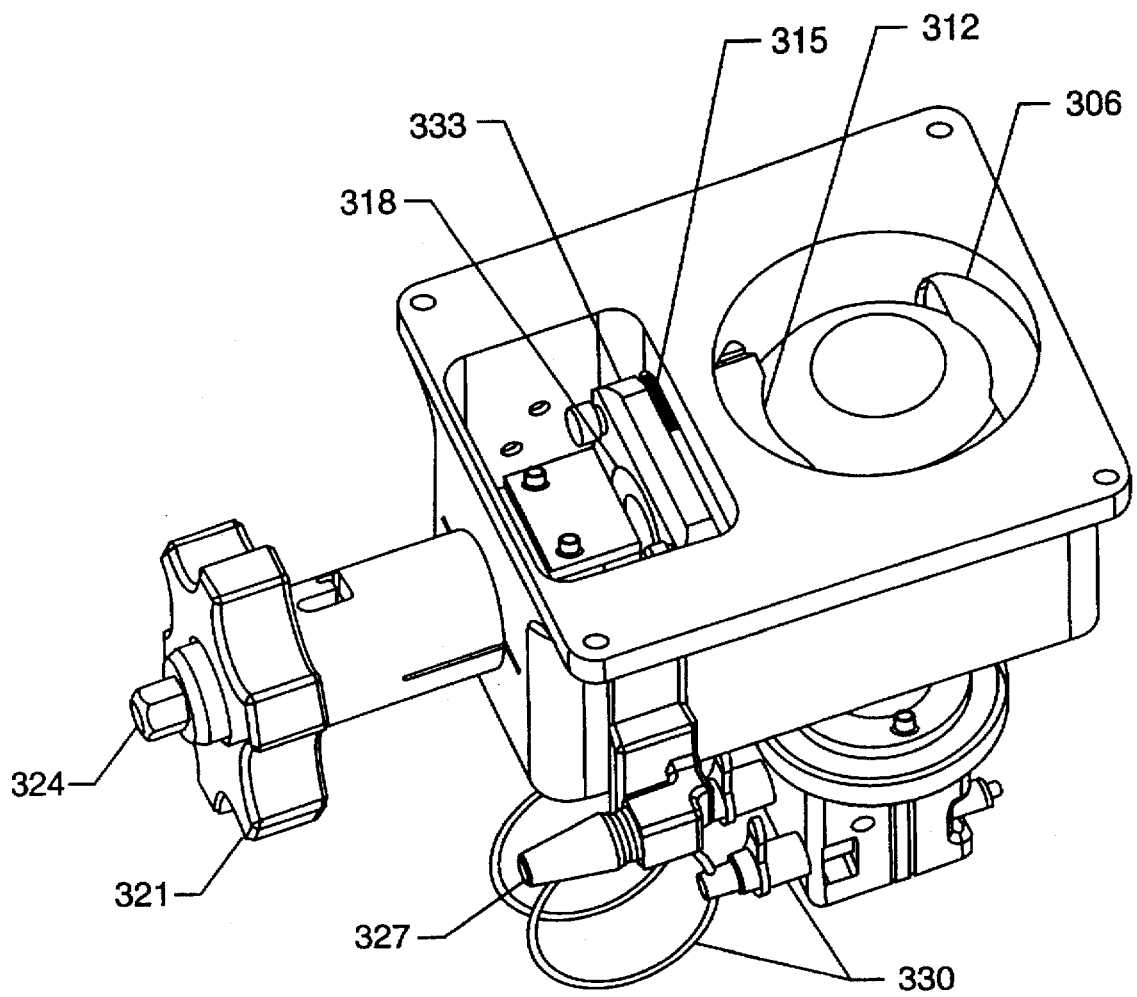
FIG. 4 is a depiction of the pointer assembly of the preferred embodiment of the invention.
Figure 5:
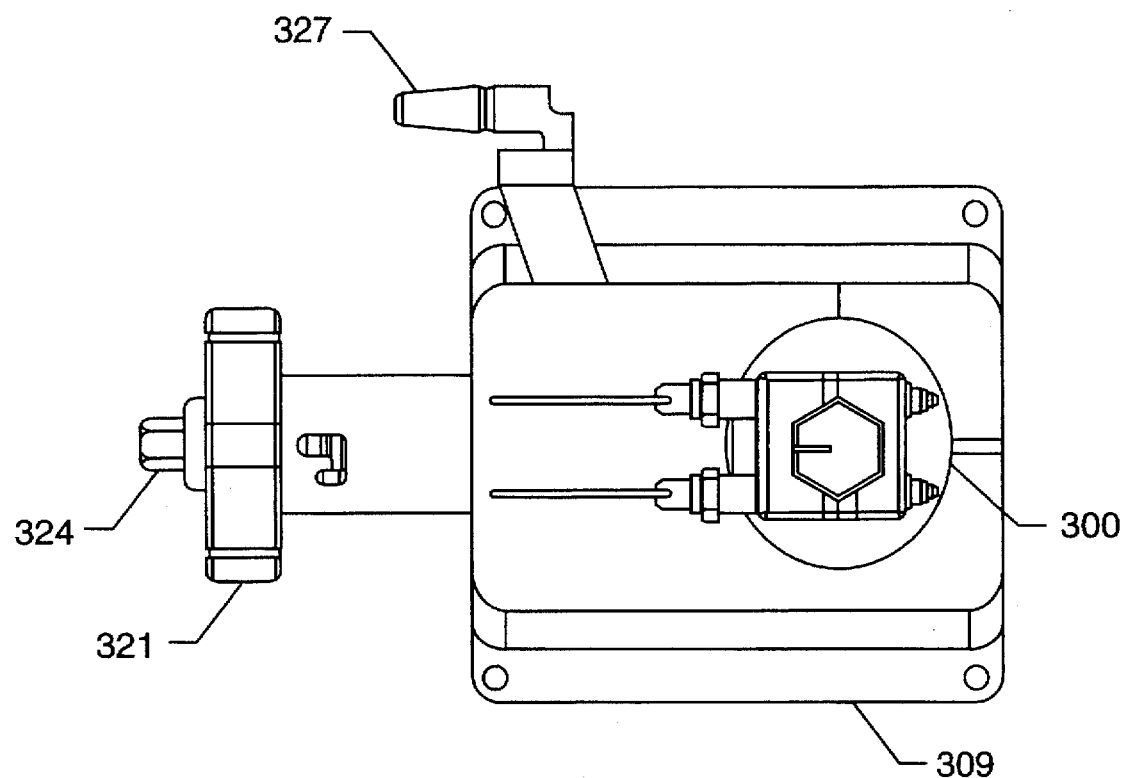
FIG. 5 is a top view of the pointer assembly of the present invention.
Figure 6:
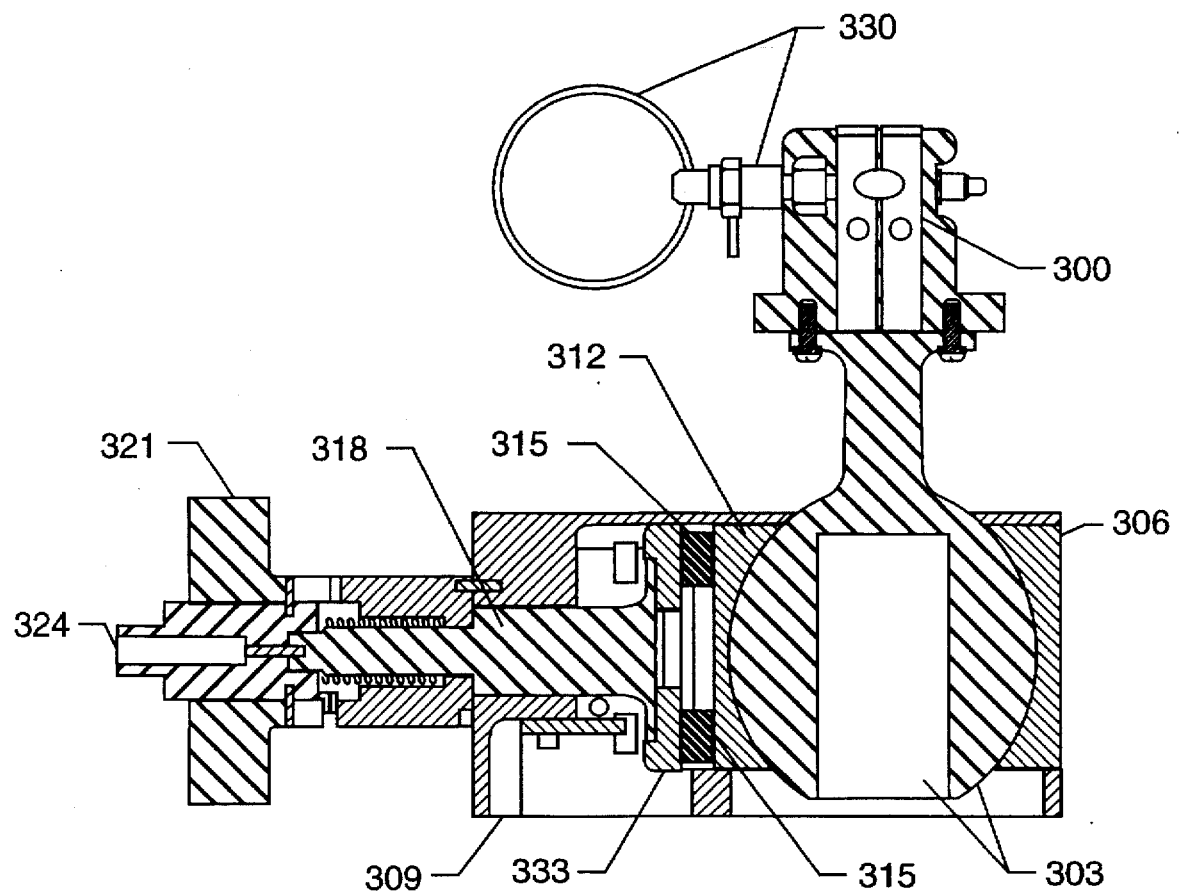
FIG. 6 is a side view of the pointer assembly of the present invention.

Referring now to FIGS. 4, 5, and 6, several views of the pointer portion of the preferred embodiment of the present invention are depicted. The pointer portion of the invention holds the experiment rigidly in an adjustable viewing angle relative to the handrail clamp portion. The pointer portion and the handrail clamp portion are rigidly affixed to each other in the invention; however, the handrail clamp portion is not shown in these drawings for ease of viewing the internal components of the pointer portion.

Experiment mounting socket 300 is used to secure the experiment to the present invention. Once the experiment is inserted within experiment mounting socket 300, the experiment is held in place with experiment locking pins 330. Experiment locking pins 330 slide through holes in experiment mounting socket 300 and the experiment itself to hold the experiment rigidly in place relative to experiment mounting socket 300. Experiment mounting socket 300 is rigidly attached to ball 303. Ball 303 is inserted within a friction cup in pointer casing 309. The friction cup consists of fixed friction cup 306, which is rigidly attached to pointer casing 309 on one side of ball 303 and spring loaded friction cup 312 which is encased in pointer casing 309 on the opposing side of ball 303. Spring loaded friction cup 312 is rigidly attached to disk spring stacks 315. The disk spring stacks 315 are rigidly attached to the spring plate 333. Spring plate 333 is movably in contact with lead screw 318. The compression of disk spring stacks 315 control the relative position of spring loaded friction cup 312, and thus the friction force exerted on ball 303 by the entire friction cup. Lead screw 318 is mechanically attached to disk spring stacks 315, and may be rotated to adjust their compression. Connected to the end of lead screw 318 are EVA locking knob 321 and hex locking bolt 324. EVA locking knob 321 provides a simple means of adjusting and locking the position of lead screw 318 by hand. Hex locking bolt 324 provides a tool attachment for applying torques of greater than 4.5 newton-meters on lead screw 318. Bayonet fitting 327 is attached to pointer casing 309 and provides an attachment for an astronaut mini-workstation during extra-vehicular activities.

During normal operation, the experiment would be attached to experiment mounting socket 300. With no compression on disk spring stacks 315, ball 303 would rotate freely, allowing the experiment to be moved into the correct viewing position. Once the experiment was in position, the astronaut tightens EVA locking knob 321 and hex locking bolt 324, compressing disk spring stacks 315. The compression of disk spring stacks 315 move spring loaded friction cup 312 tightly against ball 303, holding it in place. The use of a friction ball and cup approach means that the experiment will be held statically in place under normal operating loads; however, instant forces on mounting socket 300 in excess of normal operating loads will overcome the friction resistance and allow the ball to rotate. This ensures that the experiment mounting socket will flex under large "kick" loads.

Figure 7:
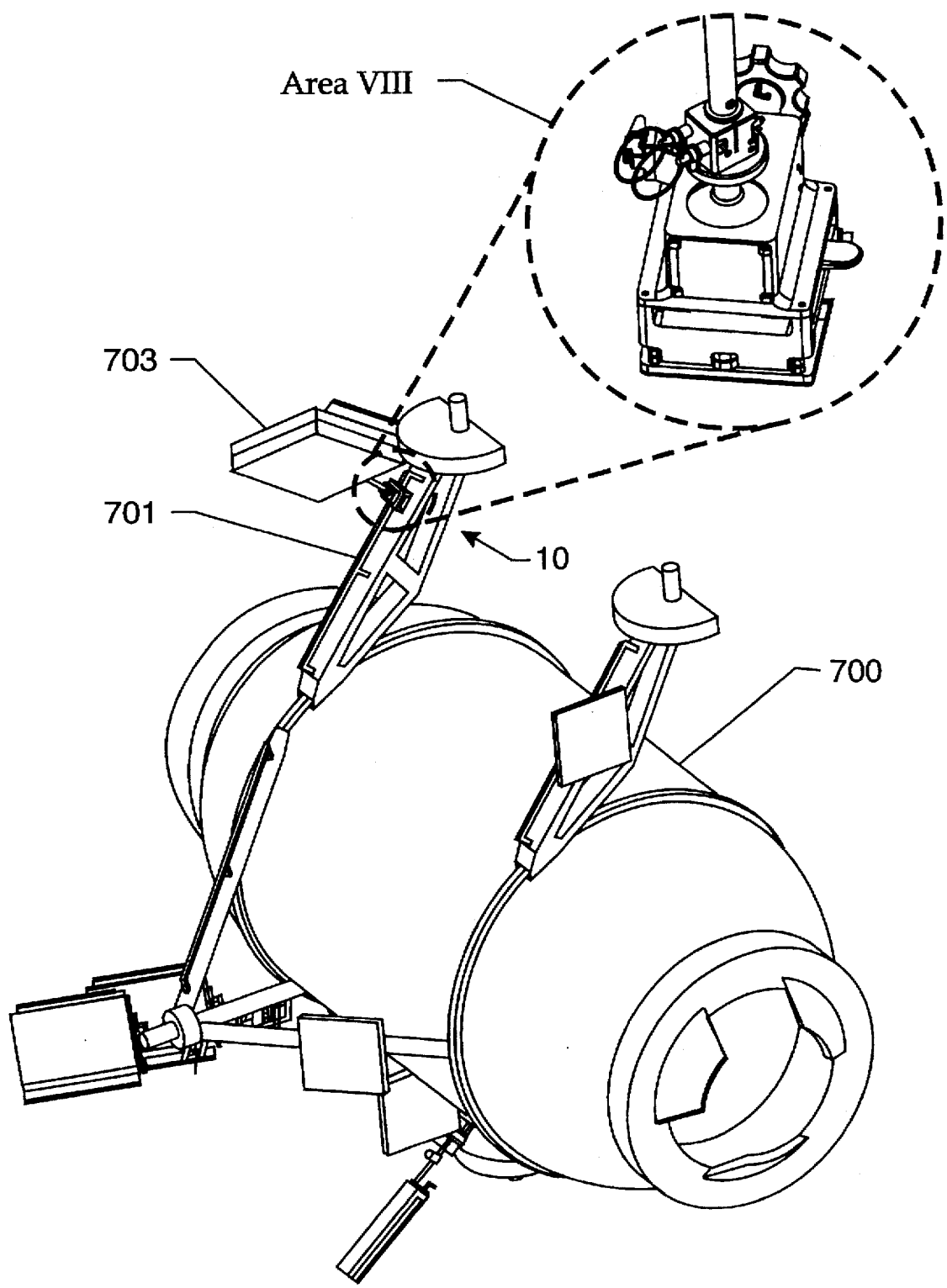
FIG. 7 is a perspective view of the present invention deployed on a docking module.

Referring now to FIG. 7, the complete present invention 10 attached to a MIR docking module 700 is shown. The combination space station handrail clamp and pointing device is shown clamped to one of the MIR docking module handrails 701. The entire invention is contained with dotted circle VIII and is shown holding a typical external space station payload 703.

Figure 8:
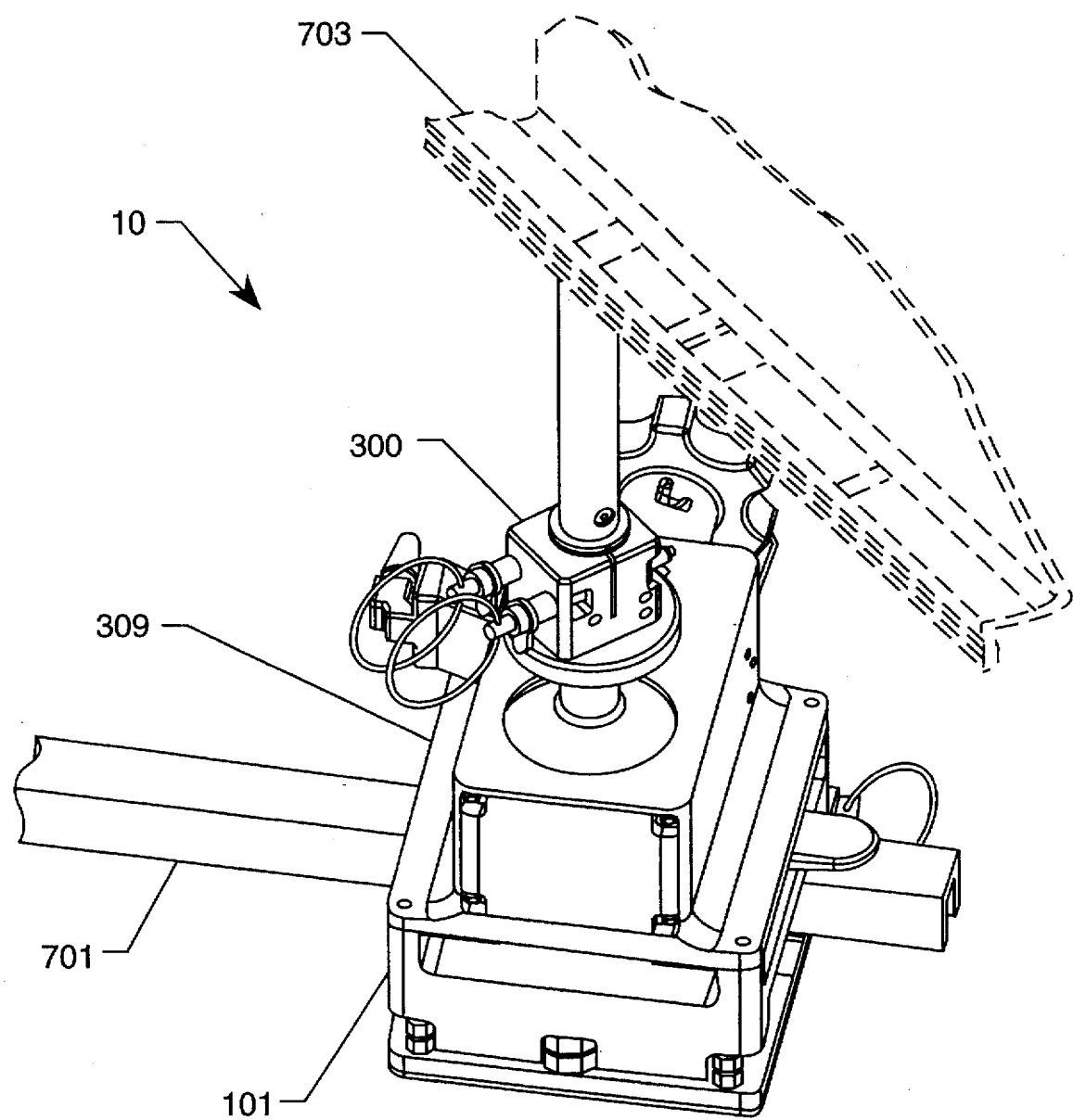
FIG. 8 is an enlarged perspective view of area VIII in FIG. 7.

Referring now to FIG. 8, an enlarged view of the combination space station handrail clamp and pointing device as taken from FIG. 7 is shown. Clamp casing 101 and pointer casing 309 are rigidly attached to each other, providing one solid unit. Experiment mounting socket 300 is attached to the combined unit through the ball and socket friction joint. A portion of the typical external space station payload 703 is visible, attached to the pointer mechanism, and a portion of handrail 701 is shown with the clamp assembly attached thereto.

The features and advantages of the invention are numerous. The invention has a precision handrail clamp and pointer device affixed to each other. Together, they give the present invention the ability to attach to handrails without deforming the attachment point and to provide high precision, flexible positioning of an experiment. Multiple load points on the handrail are used to provide for a distribution of the clamping load, which decreases the possibility of the clamp deforming the handrail to which it is attached. Independent spring stacks are used to allow the handrail clamp to provide a constant load even when the dimensions of the handrail vary slightly. A ball and friction cup are used to provide precise positioning of the attached experiment. The use of a friction cup allows the positioning of the experiment to be maintained under operating loads of up to 0.5 g while still slipping under large, instant kick loads. The present invention has also been designed with its use in mind. Large knobs and levers provide for one handed operation by a gloved astronaut, astronaut tool attachment points are provided, and the entire assembly is made of materials which will not experience cold welds at low temperatures.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A device for attaching and positioning an external space station payload comprising:
   an experiment mounting socket;
   a means for positioning said socket flexibly attached to said socket such that the orientation of said socket to said positioning means can be varied; and
   a means for clamping to a handrail rigidly attached to said positioning means, wherein said means for clamping includes
   a clamp casing,
   a capture plate having a hinged attachment to said clamp casing,
   a bearing assembly having a plurality of pressure points, said bearing assembly attached to said clamp casing, and
   a clamp lever attached to and operating said bearing assembly to provide a clamping action.

2. A device for attaching and positioning an external space station payload as in claim 1 wherein said positioning means further comprises:
   a pointer casing;
   a friction cup attached to said casing; and
   a ball displaced within said friction cup and rigidly attached to said experiment mounting socket.

3. A device for attaching and positioning an external space station payload as in claim 2 wherein said friction cup further comprises a fixed friction cup and a spring loaded friction cup; said fixed friction cup being rigidly attached to said casing and said spring loaded friction cup being attached by springs to said casing.

4. A device for attaching and positioning an external space station payload as in claim 3 wherein said spring loaded friction cup is attached to said casing with disk spring stacks, the compression of said disk spring stacks being adjustable.

5. A device for attaching and positioning an external space station payload as in claim 4 wherein said disk spring stacks further comprise a lead screw and a means for tightening and locking said lead screw.

6. A device for attaching and positioning an external space station payload as in claim 4 wherein said locking means is an extra-vehicular activity locking knob and hex locking bolt.

7. A device for attaching and positioning an external space station payload comprising:
   an experiment mounting socket;
   a pointer casing;
   a friction cup mechanism attached to said casing comprising a fixed friction cup and a spring loaded friction cup, said fixed friction cup being rigidly attached to said casing and said spring loaded friction cup being attached by springs to said casing;
   a ball displaced within said friction cup and rigidly attached to said experiment mounting socket;
   means for locking said cup mechanism attached thereto;
   a clamp casing attached to said pointer casing;
   a capture plate having a hinged attachment to said clamp casing;
   a bearing assembly having a plurality of pressure points, said bearing assembly attached to said clamp casing; and
   a clamp lever attached to and operating said bearing assembly to provide a clamping action.

* * * * *